(12) United States Patent
Gazit

(10) Patent No.: US 6,298,089 B1
(45) Date of Patent: Oct. 2, 2001

(54) METHOD FOR SEAMLESS AND NEAR SEAMLESS AUDIO AND NON-VIDEO SPLICING OF A DIGITAL TRANSPORT STREAM

(75) Inventor: Hillel Gazit, Palo Alto, CA (US)

(73) Assignee: Viewgraphics, Inc., Mt. View, CA (US)

( * ) Notice: Subject to any disclaimer, the term of this patent is extended or adjusted under 35 U.S.C. 154(b) by 0 days.

(21) Appl. No.: 09/357,722

(22) Filed: Jul. 21, 1999

Related U.S. Application Data
(60) Provisional application No. 60/111,666, filed on Dec. 10, 1998.

(51) Int. Cl.[7] ............................................. H04B 1/66
(52) U.S. Cl. ............................................. 375/240.28
(58) Field of Search ............................ 375/240, 240.26, 375/240.28, 240.01, 240.02, 240.12; 348/423, 705, 706, 845, 845.2, 845.3; 382/232, 236; 386/51, 52; H04B 1/66

(56) References Cited

U.S. PATENT DOCUMENTS

| | | | |
|---|---|---|---|
| 5,859,660 | * 1/1999 | Perkins et al. | 348/9 |
| 5,917,830 | * 6/1999 | Chen et al. | 370/487 |
| 6,038,000 | * 3/2000 | Hurst, Jr. | 348/845 |
| 6,049,569 | * 4/2000 | Radha et al. | 375/240 |
| 6,137,834 | * 10/2000 | Wine et al. | 375/240 |
| 6,141,358 | * 10/2000 | Hurst, Jr. et al. | 370/543 |
| 6,154,496 | * 11/2000 | Radha | 375/240.28 |
| 6,195,368 | * 2/2001 | Gratacap | 370/535 |
| 6,208,691 | * 3/2001 | Balakrishnan et al. | 375/240.12 |

OTHER PUBLICATIONS

Donovan et al., Pharse splincing and variable substitution using the IBM trainable speech synthesis system, Acoustics, Speech, and Signal Processing, 1999. Proceedings., 1999 IEEE International Conference on, vol.: 1 1999, pp. 373–376.*

Radha et al., Compressed video seamless switching using variable prarameters, Image Processing, 1998. CIP 98. Proceedings. 1998 Iternational Conference vol.: 1 1998, pp. 862–865.*

Balakrishnan et al., Rate and buffer regulation in a video encoder for seamless splicing, Image Processing, 1998.ICIP 98. Proceedings, 1998 International Conference vol.: 1 1998, pp. 880–883.*

Wee et al., Splicing MPEG video streams in the compressed domain, Multimedia Signal Processing, 1997., IEEE First Workshop on, 1997, pp. 225–230.*

Brighwell et al, Flexible switching and editing of MPEG–2 video bitstreams, Broadcasting Convention, 1997. International, 1997, pp. 547–552.*

Birch, C.H., MPEG splicing and bandwidth management, Broadcasting Convneiton 1997, International, 1997, pp. 541–546.*

* cited by examiner

Primary Examiner—Chris Kelley
Assistant Examiner—Tung T. Vo
(74) Attorney, Agent, or Firm—Roy W. Latham

(57) ABSTRACT

In a system of seamless splicing of multimedia data streams, the method includes the steps of scanning forward in time until a first audio Packetized Elementary Stream (PES) header with an Audio Presentation Time Stamp (APTS) greater than the Video Presentation Time Stamp (VPTS) is detected. Then, continuing to scan audio packets until an audio frame header is detected, and replacing each audio packet encountered that did not contain this specific audio frame header (or Audio PES header) with a null packet. By these steps, an audio splice-in point that does, in fact, support a near-seamless audio splice is determined. The method of accomplishing a near-seamless audio splice includes the steps of scanning forward in time until the first audio PES header with APTS greater than VPTS is detected, and replacing each audio frame header with a null packet.

11 Claims, 3 Drawing Sheets

METHOD FOR SEAMLESS AND NEAR SEAMLESS AUDIO AND NON-VIDEO SPLICING OF A DIGITAL TRANSPORT STREAM

REFERENCE

The information, data and all benefits of provisional application No. 60/111,666 filed Dec. 10, 1998 are incorporated by reference into this description.

The writing, the subject matter, and the description presented herein is protected under the provisions of United States Copyright laws by the Assignee, Viewgraphics, Inc., except only to any extent required by law in order to obtain and to continue all patent protection that is available during the term of any patent that issues hereon.

BACKGROUND OF THE INVENTION

Field of the Invention

The present invention relates generally to multimedia data stream processing and, more particularly, to apparatus and method for processing digitally encoded multimedia data streams.

A multimedia data stream refers to a binary stream that represents multimedia data, by which is meant video, opional audio streams, and optional other streams (such as subtitles, private data, etc.).

A digitally encoded multimedia data stream refers to a compressed version of a multimedia data stream. MPEG-2 is an example of a standard that defines compressed multimedia data formats. A multimedia data stream that has been formatted according to the MPEG-2 standard is referred to as a "MPEG-2 encoded data stream".

The term "transport stream" is defined in ISO/IEC 13818-1:1996(e) page ix. The term "single program transport stream" (SPTS) is defined in ISO/IEC 13818-1:1996(E) page xi. A single program transport stream can also be abbreviated as SPTS; which is an example of a "MPEG-2 encoded data stream".

MPEG-2 is one particular system of digitally encoding multimedia data streams, and since this system is regarded as an industry standard by many, it will be used in the following detailed description of the present invention. MPEG-2 prescribes specific protocols and capabilities, while allowing essentially unrestricted ways of implementing the prescribed protocols.

MPEG-2 encoded data streams are constructed so as not to exceed any of the limitations of the decoder buffer. Splicing involves appending a new data stream to a selected point in an existing data stream, thereby replacing the existing data stream at the splice point.

The MPEG-2 system of digitally encoding data streams usually involves a specification that has been regarded as an industry standard and, among other features, its encoding and decoding specifications prescribe an array of data stream format, timing, synchronization, and device capability parameters essentially independent of hardware and software system implementations.

However, the MPEG-2 specification, as is the specification of other systems, is deficient with regard to applications and contingencies that were unforeseen at the time the specification was first proposed. For example, it failed to anticipate the growing requirements for digitally encoded data stream splicing support with standard encoders.

The term "existing data stream" refers to an old data stream, which is a present data stream. A stream replacing the existing data stream is referred to as a "new data stream", which is the stream that plays after a splice in.

A digitally encoded data stream is encoded such that, during decoding, a decoder buffer will continuously contain a sufficient number of frames for continuous decoding but not so many frames as to overflow the decoder buffer. Such a data stream contains a variable amount of reference data for recreating a video image.

Over time, the buffer levels in a decoder will fluctuate depending on which frames and frame types have been transmitted to the buffer and which frames have been processed for display by the decoder.

Typically, video frames of a digitally encoded data stream are received by a decoder in a different order from the order they are displayed. Decoders are required to buffer data streams so that video frames can be reconstructed and re-ordered readily.

Non-video data typically consists of audio data and other data private to the stream. Since audio is decoded separately from video, the time base of an audio packet can vary widely with respect to the time base in nearby video packets multiplexed on the same transport stream. Also, an audio buffer in a decoder is small relative to the video buffer.

Consequently, if the video and audio frames have similar time stamps, video is sent much earlier (e.g., about 100 milliseconds) before the audio. For this reason, the ideal splice-in and the ideal splice-out points with respect to video do not necessarily address the splice-in and splice-out points relative to non-video data. If audio is not spliced homogeneously with video, audio packets from the old data stream may be played with video from the new stream, or audio from the new stream may be played with video from the old stream.

Standardization efforts proposed by the Society of Motion Pictures and television suggest abandonment of conventional splicing methodologies in favor of a new extension to the MPEG-2 specification. The proposed standard contains a new integrated protocol directed specifically at performing seamless splicing of a data stream pair.

The proposed standard provides for incorporation of splice points and related splicing support information directly into the data stream at the time of encoding. Unfortunately, the proposed standard will require the expense of at least replacing a very large number of existing encoders in production today. Moreover, the proposed standard does not address splicing at arbitrary frames within an MPEG-2 encoded data stream.

Methods have been suggested recently for seamlessly splicing MPEG-2 digitally encoded data streams using the large install base of encoders without requiring new encoding protocols. However, these methods do not specifically address how to preserve the seam between two data streams for the audio and non-video components of the data stream.

Therefore, the problem persists for splicing two data streams while preserving the seam between them. Clearly, what is needed is a new and completely different approach to solving the problem, such a solution is provided by the present invention, which is described in detail hereinafter.

OBJECTS AND SUMMARY OF THE INVENTION

It is a principal object of the present invention to provide a new and improved method of processing digitally encoded-data streams.

It is a further object of the present invention to provide a method for determining splice-in and splice-out points for audio and non-video data.

Another object of the present invention is to provide a new and improved method for seamlessly splicing MPEG-2 digitally encoded data streams while preserving the seam between them.

Briefly a method in accordance with the present invention involves splicing audio and non-video data with a digitally encoded data stream. When a splicing point is identified in a program transport stream, the present invention will permit a near seamless splice-in and splice-out of data streams at these points for audio and other non-video data.

Other features, objects and advantaged of the present invention will become more readily apparent from the following detailed description of the presently preferred embodiment.

DETAILED DESCRIPTION OF THE INVENTION

According to MPEG-2 Systems Specification, the presentation time stamp (PTS) and decoding time stamp (DTS) are in units of 1/90,000 seconds Therefore, the program clock reference (PCR) base is viewed as having 90,000 ticks per second.

A seamless splice is one in which no anomalies exist near the splice point, Such anomalies might include, but are not limited to, black or blank frames or non-synchronous switching of audio and video data.

There are three related methods for splicing audio and non-video data with a digitally encoded data stream, according to the present invention. These methods vary in terms of implementation, complexity and smoothness at a splice seam Each method may make use of the procedure to calculate the video splice points, and each method pertains only to audio and other non-video data. Each method described applies to SPTS's that have at least one audio or non-video data stream.

A first of these method determines the splice-in point by frame position. Referring to video splice-in point 170, FIG. 1, a video packet 125 is the first packet of a new single program transport stream (SPTS) to be spliced-in. (The new SPTS refers to the stream that plays after splice in, and the old SPTS refers to the stream that plays before splice out.) The audio splice-in point is determined by scanning forward in time, The payload of each audio packet is scanned for the beginning of the first audio frame after video splice-in point 170. Each audio packet after the video splice-in point 170 that does not contain the next audio frame header is replaced with a null packet. A null packet is established by setting the packet identifier (PID) field in the packet header to 1FFF (hexadecimal) with the following byte set to 10 (hexadecimal).

Figure 1:
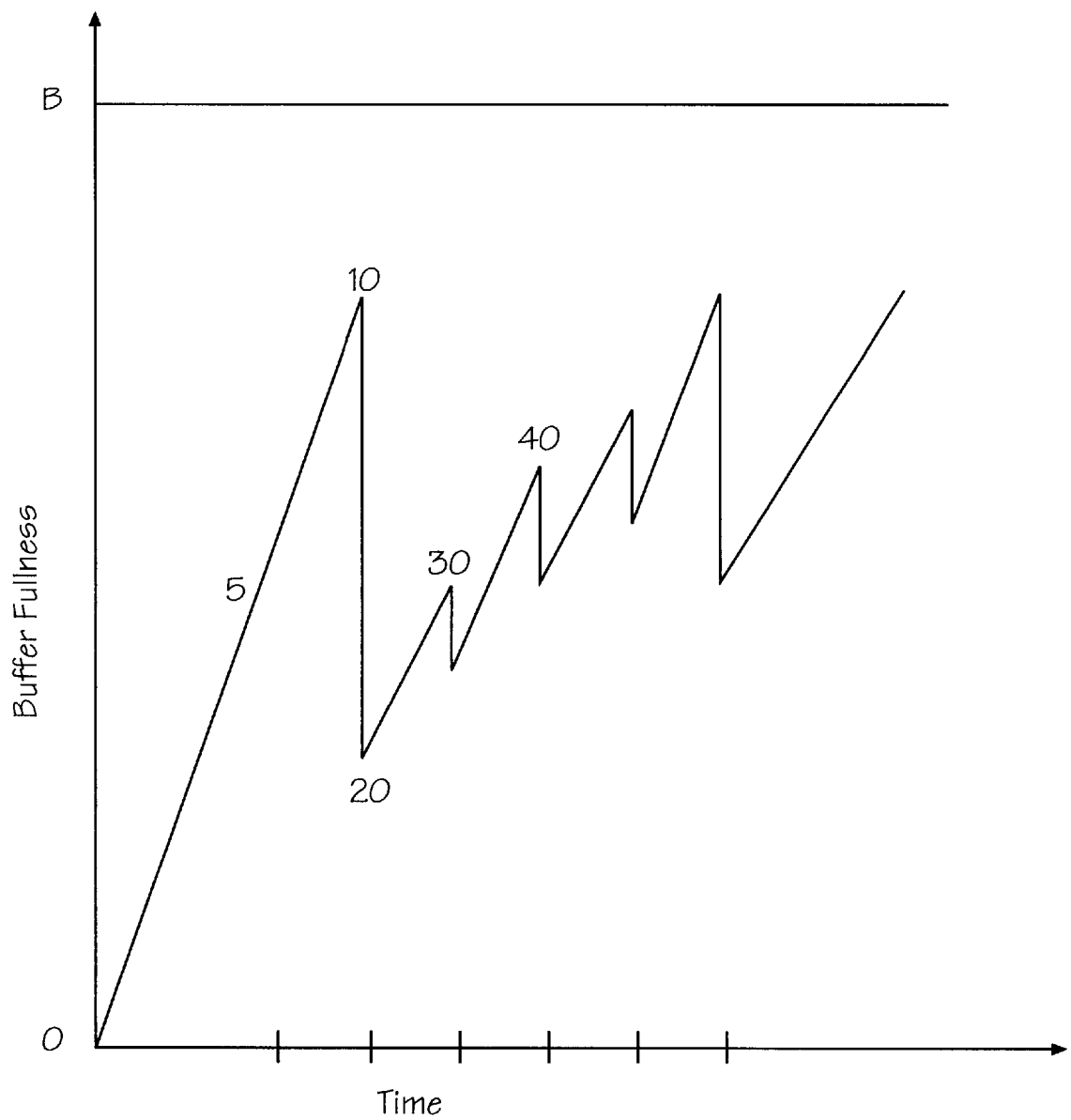
FIG. 1 illustrates a sequence of video and non-video MPEG-2 transport packets representing a single program transport stream (SPTS) and a possible video splice-in point.

Assume audio packet 150 in FIG. 1 contains the first audio frame header following the video splice-in point 170. Then, audio packet 135 is replaced with a null packet.

This method is straight forward to implement. However, by a modification of this method requiring more processing cycles to scan additional audio packet payloads, it is assured that audio of the new SPTS does not overlap video of the old SPTS. This modification determines the splice-in point by Presentation Time Stamp (PTS).

In other words, the audio splice-in point is determined by scanning forward in time until the first audio packetized elementary stream (PES) header with an audio PTS (APTS) greater than the video PTS (VPTS) is detected: APTS>VPTS. (The audio PTS is contained in the audio PES header.)

This modification only continues the scanning audio packets step, described above, until an audio frame header is detected. Then, each audio packet scanned that did not contain this specific audio frame header (or audio PES header) is replaced with a null packet. The audio PTS is preserved for correct decoding.

Figure 2:
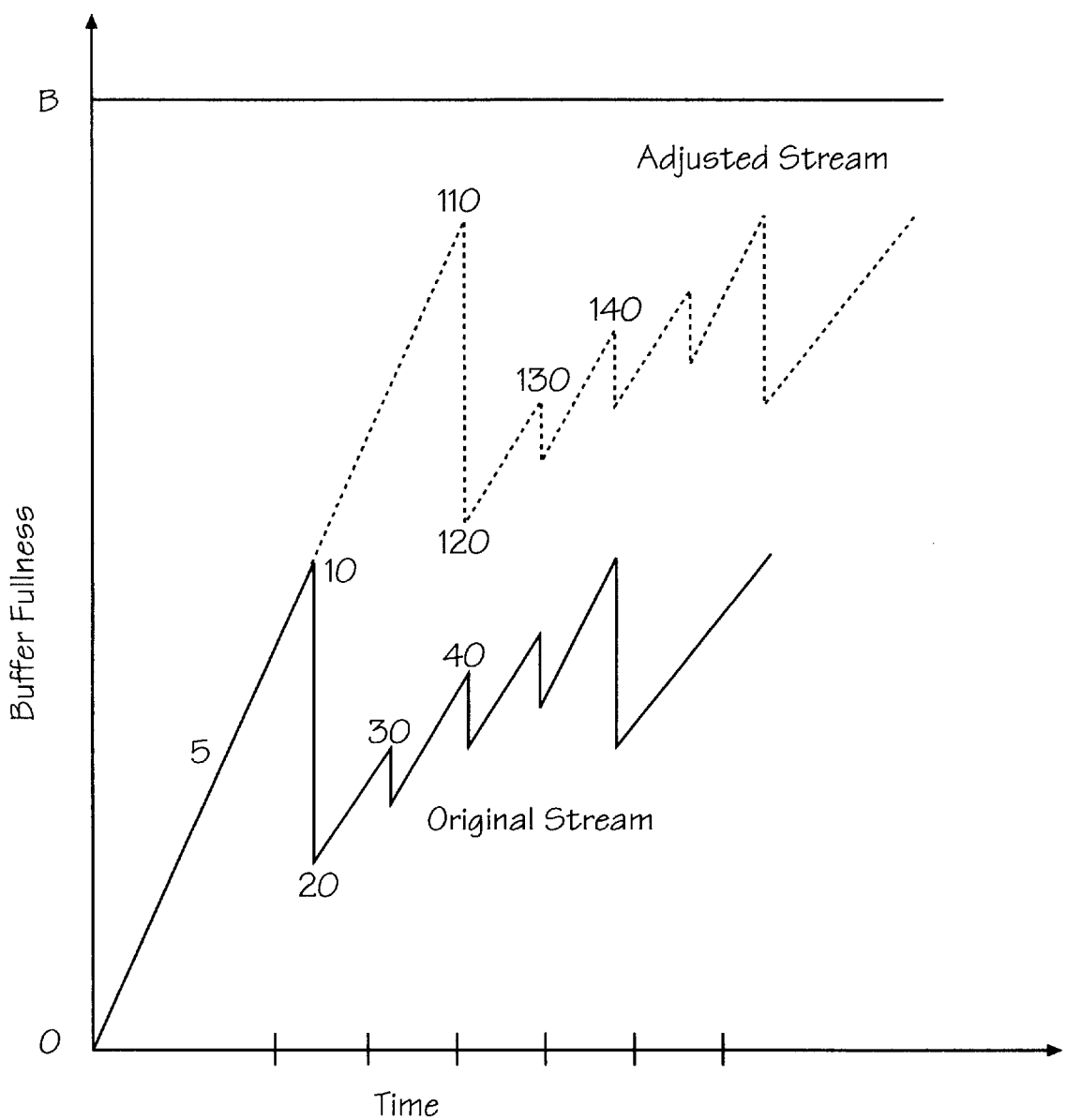
FIG. 2 illustrates a sequence of video and non-video MPEG-2 transport packets representing a SPTS and a possible video splice-out point.

A second method determines the splice-out point by position in the old SPTS. Referring to FIG. 2, video packet 245 is the last video packet of the old SPTS before the video splice-out point 270. The audio splice-in point is determined by scanning backwardly in time. The payload of each audio packet payload is scanned for the beginning of the first audio frame before video splice-out point 270.

Each audio packet before the video splice-out point 270 that does not contain the next audio frame header is replaced with a null packet. If audio packet 215 contained such an audio frame header, then the audio packet 235 is replaced with a null packet.

A third method determines the splice-out point by PTS. Referring to the video splice-out point 270 in FIG. 2, video packet 245 is the last packet of the old SPTS. Then, the audio splice-in point is determined by scanning forward in time until the last audio PES header with APTS<VPTS is detected.

Assume this is packet 265 in FIG. 2. Each video packet between the video splice-out point 270 and packet 265 is replaced with a null packet. Video packets 250, 255, and 265 are replaced with null packets. This method supports a more accurate audio splice-out point relative to the video splice-out point.

A fourth method supports a near-seamless audio splice, while keeping the video buffer levels in the decoder sufficiently high. By combining the modification of the first method for splice-in with the third method for splice-out, any resulting gap of non-video data in the combined SPTS is minimized. The non-video gap is relative to the combined stream resulting by splicing out of the old SPTS and splicing in the new SPTS.

Those audio packets that are replaced with nulls in the old SPTS are injected into the new SPTS for a near seamless splice. (The resulting splice produces an audio gap of less than one audio frame.)

These audio packets from the old SPTS first are copied into an intermediate splice buffer prior to being transmitted to the decoder. The PTSs contained in these packets ore adjusted by adding a constant. This constant, C, can be defined, according to the present invention, by the following relationship:

$$C=\text{VPTS\_NEW(FIRST)}-[\text{VPTS\_OLD(LAST)}+\text{PICTURE\_GAP}]$$

The constant C is used to adjust the PTS as follows:

$$\text{APTS\_NEW}(j)=\text{APTS\_OLD}(j)+C$$

where:

APTS_NEW(j) is the audio presentation time of the j-th audio frame stored in the intermediate non-video splice buffer;

APTS_OLD(j) is the audio presentation time of the j-th audio frame of the old SPTS;

VPTS_NEW(FIRST) is the presentation time of the first video frame spliced in from the new SPTS;

VPTS_OLD(LAST) is the presentation time of the last video frame of the old SPTS; and PICTURE_GAP is calculated as the Ticks per Second divided by the number of pictures per second, erg., for NTSC, this is 90,000/(30,000/1001).

These audio packets, then, are injected into the new stream by replacing a combination of null packets and leading audio packets of the new SPTS. This must be done in such a way so as not to overflow the audio buffer of the decoder.

Null packets are common within SPTSs of constant bit rate (CBR). As trailing audio packets from the old packets are copied over the leading audio packets from the new SPTS, the leading audio packets are rippled through the new SPTS by replacing null packets occurring later in the new SPTS.

Figure 3:
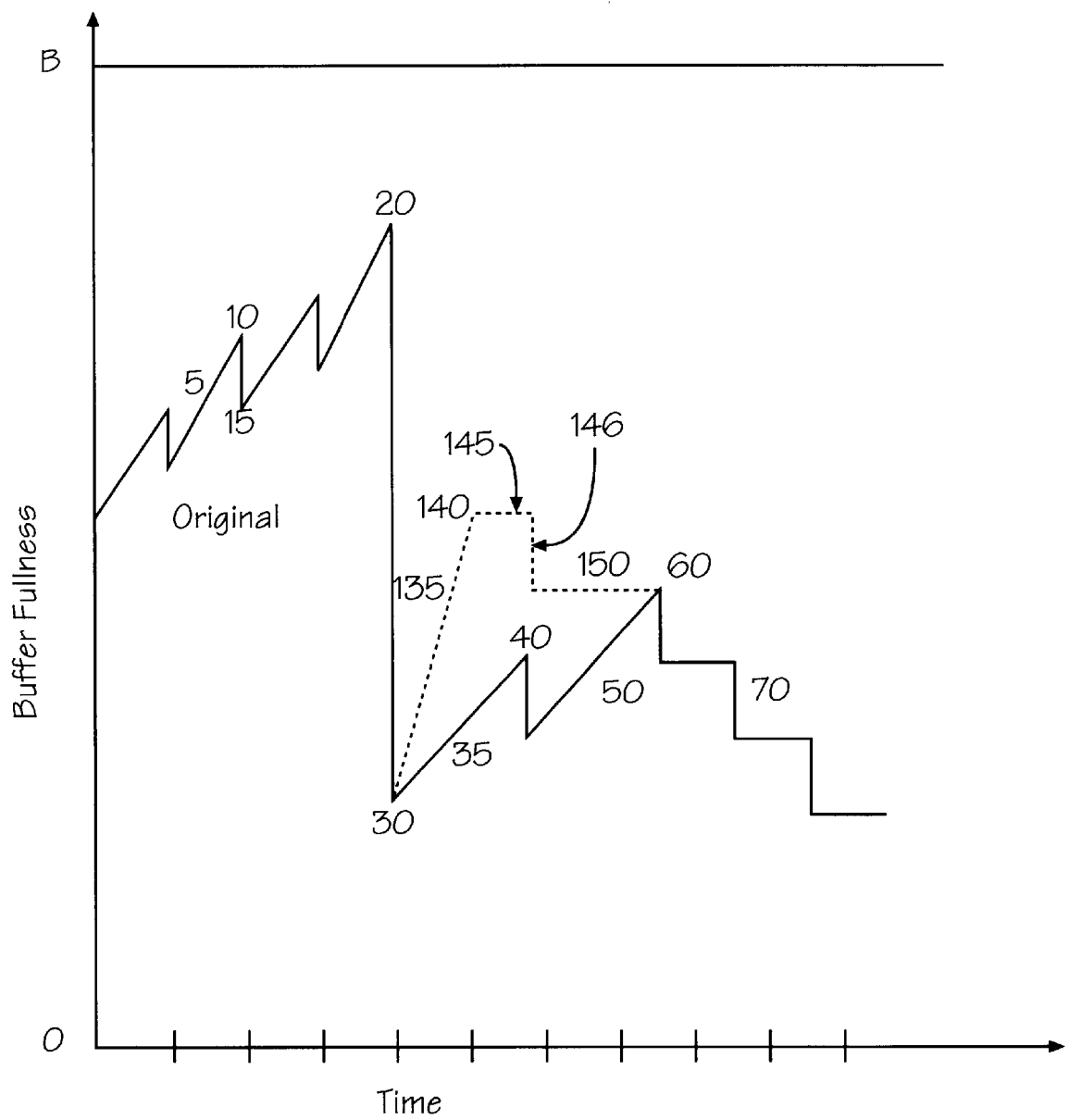
FIG. 3 illustrates how audio packets from an old data stream can be injected into a new data stream for a non-video seamless splice.

Referring to FIG. 3, noting video splice-out point 470 and video splice-in point 370, suppose that video packet 420 is the last video packet displayed from the old SPTS and that video packet 325 is the first video packet displayed from the new SPTS. Suppose that audio packets 435 and 450 have PTSs such that they are to be transitioned to the new SPTS.

Audio packets 335 and 355 of the new SPTS are copied into null packets farther down in the new SPTS. Audio packets 435 and 3450 of the old SPTS are copied into the original position of audio packets 335 and 355 respectively.

A fifth method is a further refinement of the fourth method by supporting a seamless non-video splice. This is achieved by calculating the APTS adjustment. Following the MPEG2 Audio Specification, the number of samples per frame is defined as 384 samples for layer 1 and 1152 for layers 2 and 3. The time of the audio frame is defined as:

$$time\_of\_audio\_frame = number\_of\_audio\_samples/sample\_frequency$$

The time_of_audio_frame is calculated by using only the information in one audio header. Each audio PTS in the new SPTS is modified by adding a delta derived as follows:

$$delta = APTS\_FIRST(by\_new\_PCR) - APTS\_FIRST(actual).$$

Using the relationship described above:

$$delta = APTS\_FIRST(by\_old\_PCR) + C - APTS\_FIRST(actual).$$

This is equivalent to:

$$delta = APTS\_OLD(LAST) + time\_of\_audio\_frame + C - APTS\_FIRST(actual)$$

Where:

by_old_PCR=the PCR of the old SPTS;

by_new_PCR=the PCR of the new SPTS;

APTS_FIRST(by_old_PCR)=the presentation time of the first audio packet of the new stream according to the PCR of the old stream;

APTS_FIRST(by_new_PCR)=the presentation time of the first audio packet of the new stream according to the PCR of the new stream;

APTS_FIRST(actual)=the original presentation time of the first audio header of the new streams; and APTS_OLD(LAST)=the presentation time stamp of the last audio frame of the old SPTS.

The term "delta" can be positive or negative. The closer delta is to zero, the better the quality. For each subsequent splice point, a new incremental delta must be computed and added to the previous delta.

Methods 1, 2 and 3 can be implemented in a commercial splicing product with seamless audio splice results that, while not entirely seamless, are acceptable. Method 1 and 3 above support a near-seamless audio splice. The difference between VPTS and the APTS is bounded by 1152 samples divided by the sample frequency.

Method 5 preserves all non-video data associated with the video splice-out point.

The methods of the invention are best implemented in a general purpose computer. For application to stored transport streams, virtually any computer having adequate storage for the video can be used. For real time application to transport streams, the processor must be sufficiently fast to keep up with the stream rates.

While the present invention has beep described in substantial detail, other and further forms, features and modifications will occur to those that are skilled in this art. Therefore, it is understood that the present invention is not limited by the description hereinabove, but rather, it is defined by the claims appended hereto.

What is claimed is:

1. In a system of implementing splicing of at least one audio and non-video data stream for predetermined video splice-in and splice-out points, comprising the steps of:

determining an audio splice-in point that supports a near-seamless audio splice, including the steps of:

scanning a Single Program transport Stream (SPTS) forward in time from the video splice-in point;

examining each audio packet encountered to determine whether it is the first audio frame after the video splice-in point; and replacing each audio packet encountered that is not a first audio frame with a null packet;

implementing splicing audio and non-video data streams at said audio splice-in point, including the steps of;

scanning forward in time until the last audio PES header with APTS<VPTS is detected;

replacing each video packet between the video splice-out point and this point with a null packet;

copying the audio packets for the old SPTS to an Intermediate splice buffer; and adding a predetermined constant to the PTS of the audio packets in the intermediate splice buffer;

whereby a near-seamless audio splice is accomplished.

2. In a system of implementing splicing of at least one audio and non-video data stream for predetermined video splice-in and splice-out points, a method for determining the audio splice-in point including the steps of:

scanning a Single Program Transport Stream (SPTS) forward in time from the Video splice-in point;

examining each audio packet encountered to determine whether it is the first audio frame after the video splice-in point; and replacing each audio packet encountered that is not a first audio frame with a null packet;

whereby an audio splice-in point that supports a near-seamless audio splice is determined.

3. The method of claim 2 where a null packet is established by setting the packet identifier field in a packet header to 1FFF (hexadecimal) with the following byte set to 10 (hexadecimal).

4. In an MPEG-2 system of splicing audio and non-video data streams, a method for determining an audio splice-in point comprising the steps of:

scanning forward in time Until the first audio Packetized Elementary Stream (PES) header with an Audio PTS (Audio Presentation Time Stamp) (APTS) greater than the Video PTS (VPTS) is detected;

continuing to scan audio packets until an audio frame header is detected; and replacing each audio packet encountered that does not contain this specific audio frame header (or Audio Packetized Elementary Stream header) with a null packet;

whereby an audio splice-in point that supports a near-seamless audio splice is determined.

5. In a MEG-2 system of splicing at least one audio and non-video data stream, a method for determining the audio splice-out point comprising the steps of:

scanning the SPTS backward in time from the video splice-out point;

examining each audio packet thus encountered for the beginning of the first audio frame before a video splice-out point; and replacing each audio packet encountered that does not contain an audio frame header with a null packet;

whereby an audio splice-out point that supports a near-seamless audio splice is determined.

6. In a system for splicing of at least one audio and non-video data stream, a method for determining the audio splice-out point comprising the steps of:

scanning forward in time until the last audio PES header with APTS<VPTS it detected;

replacing each video packet between the video splice-out point and this point with a null packet;

whereby an audio splice-out point that supports a near-seamless audio splice is determined.

7. A method for splicing of at least one audio and non-video data stream/comprising the steps of:

scanning forward in time until the first audio packetized elementary stream (PBS) header with an audio PTS (APTS) greater than the video PTS (VPTS) is detected;

continuing to scan audio packets until an audio frame header is detected;

replacing each audio packet encountered that does not contain this specific audio frame header (or audio PES header) with a null packet;

scanning forward in time until the last audio PES header with APTS<VPTS is detected;

replacing each video packet between the video splice-out point and this point with a null packet;

copying the audio packets for the old SPTS to an intermediate splice buffer;

adding a constant to the PTS of the audio packets in the intermediate splice buffer where the constant is defined by:

$$C=VPTS\_NEW(FIRST)-[VPTS\_OLD(LAST)+PICTURE\_GAP]$$

where:

VPTS_NEW(FIRST) is the presentation time of the first video frame spliced in from the new SPTS;

VPTS_OLD(LAST) is the presentation time of the last video frame of the old SPTS;

PICTURE_GAP is calculated as the Ticks per Second divided by the number of pictures per second;

replacing a combination of null packets and leading audio packets of the new SPTS with audio packets from the intermediate splice buffer;

whereby a near-seamless audio splice is accomplished.

8. The method at defined by claim 7, including the step of replacing a combination of said null packets and leading audio packets of said new SPTS with audio packets from said intermediate splice buffer.

9. A method for seamless at least one splicing audio and non-video data stream, comprising the steps of;

scanning forward in time until a first audio packetized elementary stream (PES) header with an audio PTS (APTS) greater than a video PTS (VPTS) is detected;

continuing to scan audio packets until on audio frame header is detected;

replacing each audio packet encountered that does not contain a specific audio frame header (or audio PES header) with a null packet;

scanning forward in time until the last audio PES header with APTS<VPTS is detected;

replacing each video packet between the video splice-out point and this point with one of said null packets;

copying the audio packets for the old SPTS to an intermediate splice buffer;

adding a constant to the PTS of the audio packets in said intermediate splice buffer, where said constant is determined by the relationship:

$$C=VPTS\_NEW(FIRST)-[VPTS\_OLD(LAST)+PICTURE\_GAP]$$

where:

VPTS_NEW(FIRST) is the presentation time of the first video frame spliced in from the new SPTS;

VPTS_OLD(LAST) is the presentation time of the last video frame of the old SPTS;

PICTURE_GAP is calculated as the Ticks per Second divided by the number of pictures per second;

whereby an audio splice-in point to support a near-seamless audio splice is determined.

10. The method as defined by claim 8, including the step of defining the time of said audio frame header by the relationship:

$$time\_of\_audio\_frame=number\_of\_audio\_samples/sample\_frequency$$

whereby a seamless audio splice is accomplished.

11. The method as defined by claim 8, including the step of modifying each audio PTS in the new SPTS by adding a delta derived as follows:

$$delta=APTS\_OLD(LAST)+time\_of\_audio\_frame+C-APTS\_FIRST(actual)$$

where:

APTS_FIRST(actual) refers to the original presentation time of the first audio header of the new stream;

APTS_OLD(LAST) is the presentation time stamp of the last audio frame of the old SPTS for subsequent splice points, computing a new incremental delta adding the computed delta to the previous delta;

whereby a seamless audio splice is accomplished.

* * * * *